United States Patent
Tennichi et al.

(10) Patent No.: US 9,365,062 B2
(45) Date of Patent: Jun. 14, 2016

(54) DISPLAY INPUT DEVICE AND IMAGE FORMING APPARATUS INCLUDING THE SAME AS WELL AS METHOD FOR CONTROLLING THE DISPLAY INPUT DEVICE

(71) Applicant: KYOCERA Document Solutions Inc., Osaka-shi, Osaka (JP)

(72) Inventors: Hideki Tennichi, Osaka (JP); Masayuki Yamashirodani, Osaka (JP)

(73) Assignee: KYOCERA DOCUMENT SOLUTIONS, INC., Osaka (JP)

( * ) Notice: Subject to any disclaimer, the term of this patent is extended or adjusted under 35 U.S.C. 154(b) by 266 days.

(21) Appl. No.: 14/064,855

(22) Filed: Oct. 28, 2013

(65) Prior Publication Data

US 2014/0118787 A1    May 1, 2014

(30) Foreign Application Priority Data

Oct. 29, 2012    (JP) ................... 2012-237641

(51) Int. Cl.
*G06T 11/60* (2006.01)
*G06F 3/12* (2006.01)
*B41J 29/00* (2006.01)
*G06F 3/033* (2013.01)
*B41J 29/38* (2006.01)
*B41J 3/46* (2006.01)

(52) U.S. Cl.
CPC .. *B41J 29/00* (2013.01); *B41J 3/46* (2013.01); *B41J 29/38* (2013.01); *G06F 3/033* (2013.01)

(58) Field of Classification Search
CPC ..... G06K 15/02; G06K 15/1803; B41J 29/38; B41J 3/46; B41J 29/00; G06F 3/033

USPC .......................................... 345/629; 358/1.15
See application file for complete search history.

(56) References Cited

U.S. PATENT DOCUMENTS

| | | | | |
|---|---|---|---|---|
| 5,818,437 A * | 10/1998 | Grover | ................. | G06F 3/0219 715/811 |
| 6,021,395 A * | 2/2000 | Goodwin, III | ......... | G06Q 20/20 235/383 |
| 2006/0103666 A1 | 5/2006 | Kita | | |
| 2008/0282155 A1* | 11/2008 | Kempanna | ........ | G06F 17/30867 715/273 |
| 2014/0089848 A1* | 3/2014 | Smith | ................... | G06Q 10/06 715/808 |

FOREIGN PATENT DOCUMENTS

JP    2006-139186 A    6/2006

OTHER PUBLICATIONS

English language Abstract for JP 2006-139186, published Jun. 1, 2006.

* cited by examiner

*Primary Examiner* — Phi Hoang
*Assistant Examiner* — Michael Le
(74) *Attorney, Agent, or Firm* — Polsinelli PC

(57) ABSTRACT

A display input device, when it has been determined that a plurality of messages, display periods of which overlap with each other, are mutually similar, selects one of the plurality of mutually similar messages as a display message to be displayed, and displays the display message in a display mode corresponding to a highest one of respective importance levels of the plurality of mutually similar messages, while not displaying, among the plurality of mutually similar messages, a message other than the display message.

8 Claims, 7 Drawing Sheets

DISPLAY INPUT DEVICE AND IMAGE FORMING APPARATUS INCLUDING THE SAME AS WELL AS METHOD FOR CONTROLLING THE DISPLAY INPUT DEVICE

INCORPORATION BY REFERENCE

This application is based on and claims the benefit of priority from Japanese Patent Application No. 2012-237641 filed on Oct. 29, 2012, the contents of which are hereby incorporated by reference.

BACKGROUND

The present disclosure relates to a display input device and an image forming apparatus including the same as well as a method for controlling the display input device.

Image forming apparatuses have a plurality of set items whose set values can be changed at the time of job execution. Such an image forming apparatus, therefore, generally includes a display input device for accepting a user's selection of, among a plurality of set items, a set item whose set value is to be changed and for accepting a user's input for changing a set value of a selected set item. In the display input device, for the purpose of improving user usability, a display portion for displaying set items, set values, and so on is provided.

Such a display input device for an image forming apparatus is configured, for example, not only to display set items, set values, and so on but also to allow a message created by a user to be registered and the registered message to be displayed.

There is a display input device of a type that assigns, to a message to be registered, any one of a plurality of importance levels into which the degree of importance is categorized and changes a display mode for displaying the message in accordance with the importance level thereof. In such a display input device, since a display mode of a message is changed depending on an importance level thereof, it becomes easy to judge how important the message being displayed is.

By the way, an image forming apparatus, when installed in an office or the like, is used by a plurality of users. Because of this, there may be a case where a plurality of mutually similar messages are registered, and mutually different importance levels are assigned to the plurality of messages, respectively. In this case, the plurality of mutually similar messages may be concurrently displayed in mutually different display modes. When, as described above, a plurality of mutually similar messages are concurrently displayed in mutually different display modes, an inconvenience arises in which a user becomes confused, being unable to judge which one of importance levels of the plurality of mutually similar messages should be relied upon.

SUMMARY

The present disclosure has been made to solve the above-described problem and has as its object to provide a display input device that allows a user to recognize an importance level of a message being displayed without causing confusion, and an image forming apparatus including the same, as well as a method for controlling the display input device.

In order to achieve the above-described object, a display input device of the present disclosure includes a storage portion, a display portion, and a determination portion. The storage portion stores display data for displaying a message a display period of which has been set and to which any one of a plurality of importance levels has been assigned. The display portion displays the message and changes a display mode of the message in accordance with an importance level thereof. The determination portion determines whether or not a plurality of messages are similar. In a case where respective display periods of the plurality of messages overlap with each other, the determination portion determines whether or not the plurality of messages, the display periods of which overlap with each other, are mutually similar. When the determination portion has determined that the plurality of messages, the display periods of which overlap with each other, are mutually similar, the display portion selects one of the plurality of mutually similar messages as a display message to be displayed, and displays the display message in a display mode corresponding to the highest one of respective importance levels of the plurality of mutually similar messages, while not displaying, among the plurality of mutually similar messages, a message(s) other than the display message.

DETAILED DESCRIPTION

Hereinafter, an image forming apparatus including a display input device according to one embodiment of the present disclosure will be described by taking as an example an image forming apparatus (multifunctional peripheral) that is capable of executing a plurality of types of jobs such as a copying job and a transmission (scanning) job.

(Overall Configuration of Image Forming Apparatus)

Figure 1:
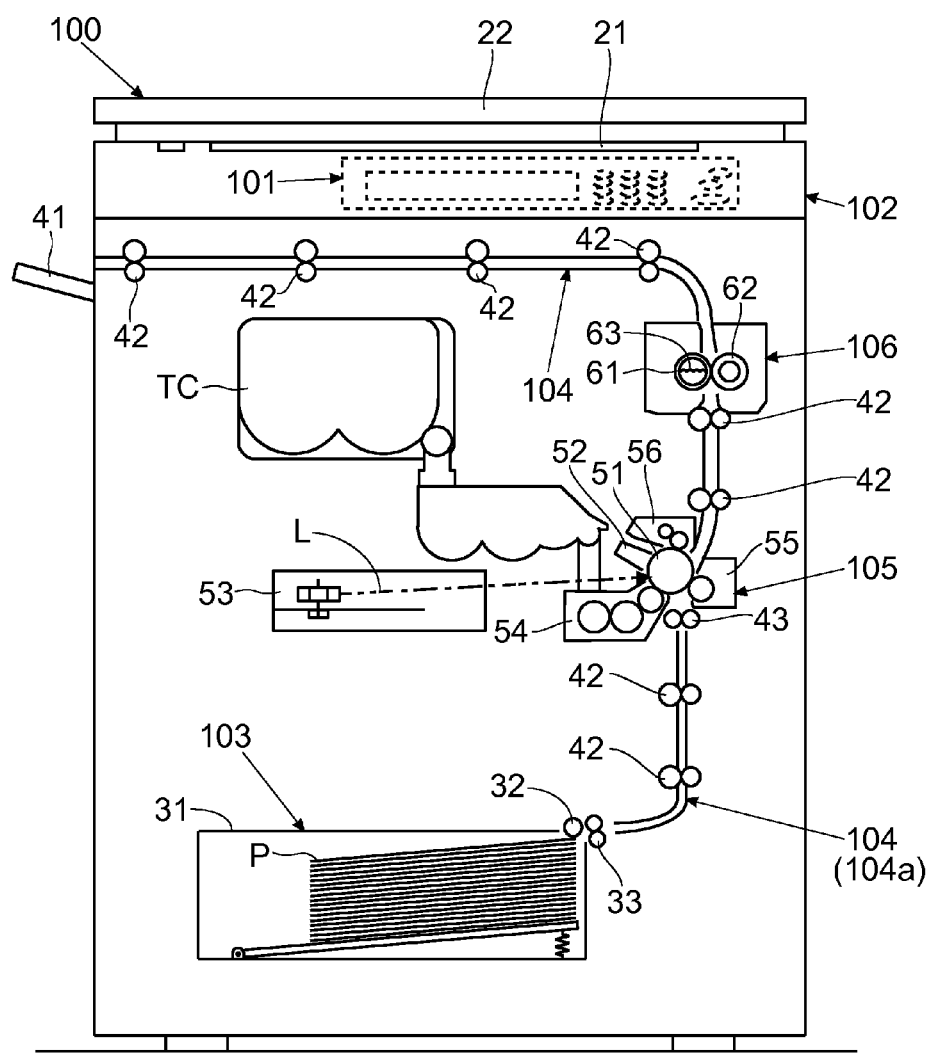
FIG. 1 is a schematic view of an image forming apparatus including a display input device according to one embodiment of the present disclosure.

As shown in FIG. 1, an image forming apparatus 100 of this embodiment includes an operation panel 101, an image reading portion 102, a paper feed portion 103, a paper sheet conveying portion 104, an image forming portion 105, and a fixing portion 106. The operation panel 101 corresponds to the "display input device" of the present disclosure.

Figure 2:
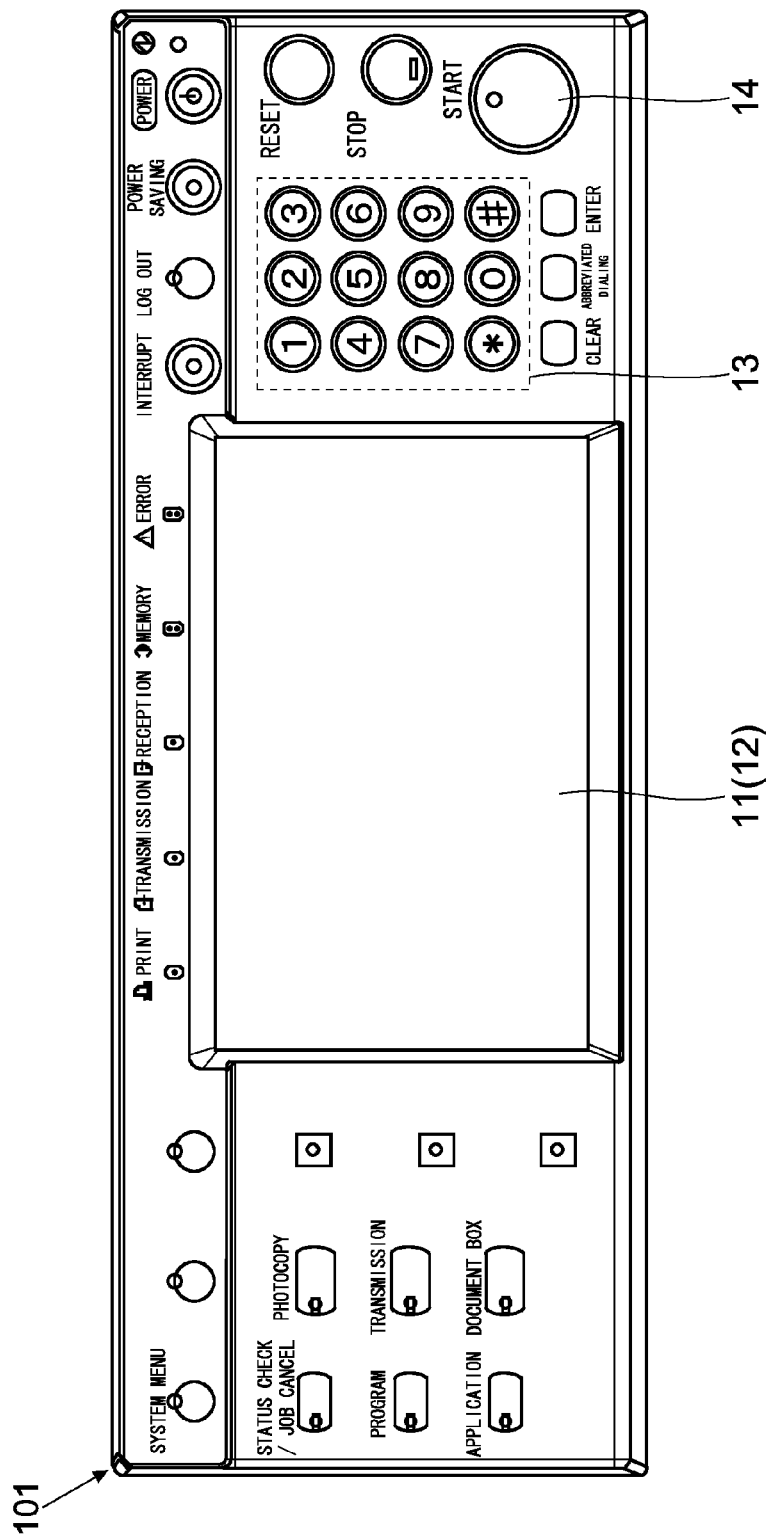
FIG. 2 is a detailed view of the display input device of the image forming apparatus according to the one embodiment of the present disclosure, which is shown in FIG. 1.

As shown in FIG. 2, the operation panel 101 has a liquid crystal display portion 12 (corresponding to the "display portion") having a touch panel portion 11 provided on a display surface thereof. The liquid crystal display potion 12 displays a screen on which set items whose set values can be changed at the time of job execution, soft keys for changing the set values of the set items, and a message showing a status of the apparatus, and so on are arranged. The touch panel portion 11 covering the display surface of the liquid crystal display portion 12 is provided for the purpose of detecting that one of the soft keys which has just been touched by a user via the touch panel portion 11. Furthermore, the operation panel 101 is provided also with hard keys such as a numeric keypad 13 for accepting an input of a numerical value and a start key 14 for accepting a command to execute a job.

Referring back to FIG. 1, the image reading portion 102 reads (scans) an original document and generates image data thereof. In the image reading portion 102, though not shown, optical members such as an exposure lamp, a mirror, a lens, and an image sensor are provided. The image reading portion 102 irradiates with light an original document placed on a contact glass 21 and generates image data by performing A/D conversion of an output value of the image sensor resulting from the image sensor receiving reflected light from the original document. It is thus possible to perform printing based on image data obtained by scanning. Furthermore, it is also possible to store image data obtained by scanning. In the image reading portion 102, an original document holder 22 for holding down an original document placed on the contact glass 21 is provided.

The paper feed portion 103 has a cassette 31 in which paper sheets P are housed and feeds the paper sheet P housed in the cassette 31 to the paper sheet conveying portion 104 (paper sheet conveying path 104a). In the paper feed portion 103, a pickup roller 32 that draws out the paper sheet P housed in the cassette 31 and a separation roller pair 33 for preventing double feed of the paper sheets P are provided.

The paper sheet conveying portion 104 conveys the paper sheet P along the paper sheet conveying path 104a extending from the cassette 31 up to an ejection tray 41. In the paper sheet conveying portion 104, a plurality of conveying roller pairs 42 are provided along the paper sheet conveying path 104a. The paper sheet P fed from the paper feed portion 103 is transported by the plurality of conveying roller pairs 42 so as to pass through the image forming portion 105 and the fixing portion 106 in this order to be guided to the ejection tray 41. Furthermore, the paper sheet conveying portion 104 includes a registration roller pair 43 that is installed at a position (a position immediately anterior to the image forming portion 105) on an upstream side of the image forming portion 105 in a paper sheet conveying direction. The registration roller pair 43 puts the paper sheet P on standby immediately in front of the image forming portion 105 and feeds out the paper sheet P with well controlled timing to the image forming portion 105.

The image forming portion 105 forms a toner image based on image data and transfers the toner image onto the paper sheet P. The image forming portion 105 includes a photosensitive drum 51, a charging device 52, an exposure device 53, a developing device 54, a transfer roller 55, and a cleaning device 56.

A toner image forming process and a toner image transfer process are as follows. First, the photosensitive drum 51 is driven to rotate, and the charging device 52 charges the surface of the photosensitive drum 51 to a prescribed potential. Furthermore, the exposure device 53 outputs a light beam L based on image data and uses the light beam L to scan and expose the surface of the photosensitive drum 51. An electrostatic latent image is thereby formed on the surface of the photosensitive drum 51. The developing device 54 receives toner from a toner container TC and supplies the toner to the electrostatic latent image formed on the surface of the photosensitive drum 51, thus developing the electrostatic latent image.

The transfer roller 55 rotates in press-contact with the surface of the photosensitive drum 51. By the registration roller pair 43, with timing controlled thereby, the paper sheet P is made to enter between the transfer roller 55 and the photosensitive drum 51. At this time, a prescribed voltage is applied to the transfer roller 55. This causes the toner image on the surface of the photosensitive drum 51 to be transferred onto the paper sheet P. After completion of the toner image transfer process, the cleaning device 56 removes residual toner and so on remaining on the surface of the photosensitive drum 51.

The fixing portion 106 fixes, by heating and pressing, the toner image that has been transferred onto the paper sheet P. The fixing portion 106 includes a heating roller 61 and a pressing roller 62. The heating roller 61 incorporates a heater 63. The pressing roller 62 is in press-contact with the heating roller 61. The paper sheet P onto which the toner image has been transferred is heated and pressed as it passes between the heating roller 61 and the pressing roller 62. The toner image is thereby fixed on the paper sheet P, and thus printing is completed. After that, the paper sheet P that has undergone the printing is transported onto the ejection tray 41 by the conveying roller pairs 42.

(Hardware Configuration of Image Forming Apparatus)

Figure 3:
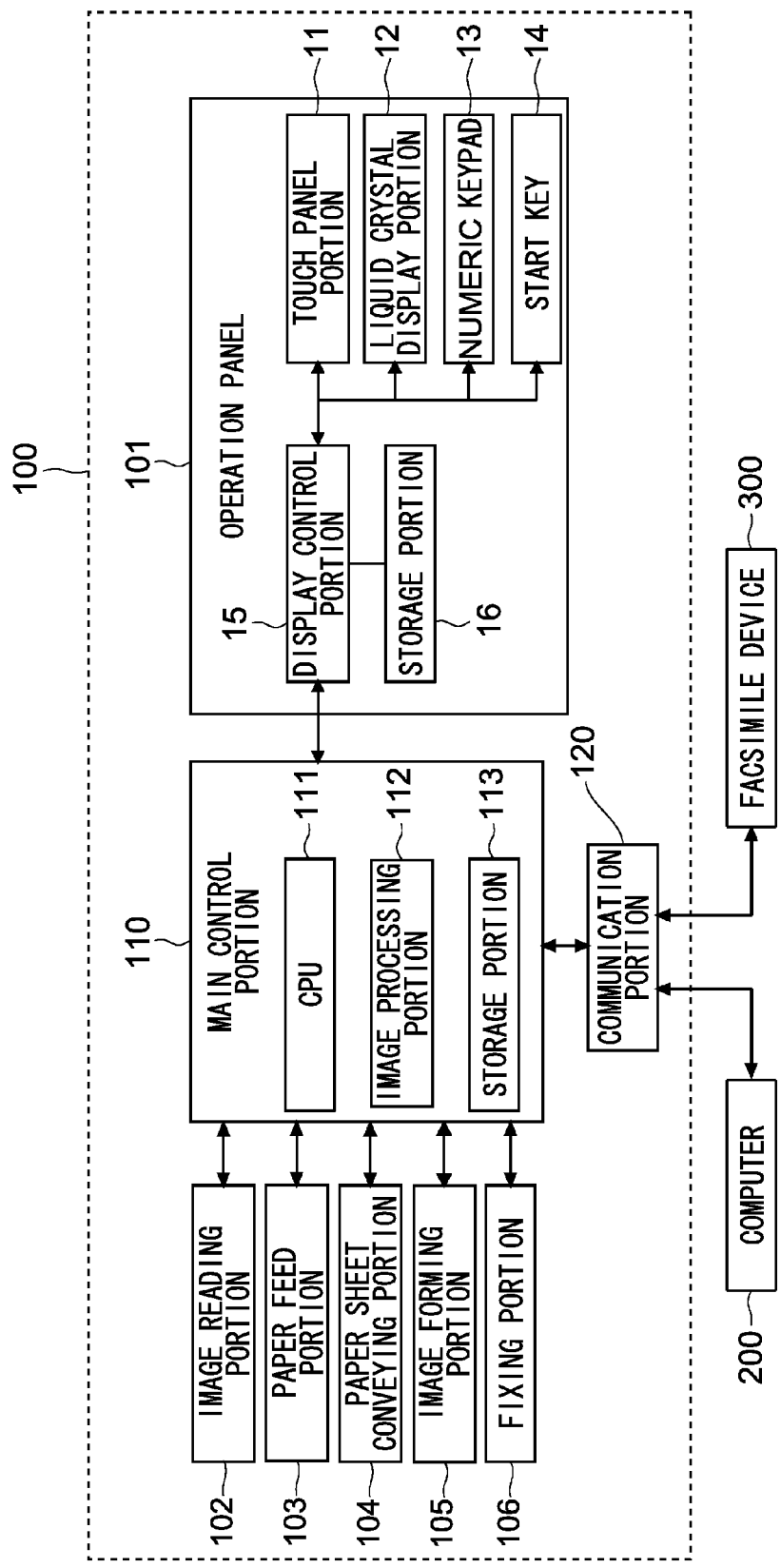
FIG. 3 is a block diagram showing a hardware configuration of the image forming apparatus according to the one embodiment of the present disclosure, which is shown in FIG. 1.

As shown in FIG. 3, the image forming apparatus 100 includes a main control portion 110. The main control portion 110 includes a CPU 111, an image processing portion 112, a storage portion 113, and so on. The image processing portion 112 is constituted by an image processing-specific ASIC, a memory, and so on and performs various types of image processing (such as enlargement/contraction, concentration conversion, and data format conversion) with respect to image data. The storage portion 113 is constituted by a ROM, a RAM, and so on, and, for example, programs and data required for executing jobs are stored in the ROM and decompressed in the RAM.

To the main control portion 110, the image reading portion 102, the paper feed portion 103, the paper sheet conveying portion 104, the image forming portion 105, and the fixing portion 106 are connected. Based on the programs and data stored in the storage portion 113, the main control portion 110 performs overall control, image processing control, drive control for driving various rotors to rotate, and so on.

Furthermore, to the main control portion 110, a display control portion 15 (corresponding to the "determination portion" of the present disclosure) that controls a display operation of the operation panel 101 is connected. For example, upon a user's touch on the soft keys displayed on the liquid crystal display portion 12, based on an output of the touch panel portion 11, the display control portion 15 detects a touched position (coordinates). That is, the display control portion 15 detects that one of the soft keys which has just been touched by the user. Then, the display control portion 15 performs control so that the liquid crystal display portion 12 displays a screen corresponding to that one of the soft keys (touched position) which has just been touched by the user. To the display control portion 15, a storage portion 16 is connected, and, for example, data representing correlations between outputs of the touch panel portion 11 and touched positions (coordinates) is stored in the storage portion 16.

Furthermore, to the main control portion 110, a communication portion 120 is connected. The communication portion 120 is, for example, communicably connected with an external computer 200 (such as a user terminal or a server) via a network. It is thus possible to perform printing based on image data transmitted from the computer 200, and it is also possible to transmit image data obtained by scanning to the computer 200. Moreover, a modem or the like may be incorporated in the communication portion 120, in which case, via a network such as telephone lines, facsimile communications with an external facsimile device 300 can be performed.

(Registration of Message)

Figure 4:
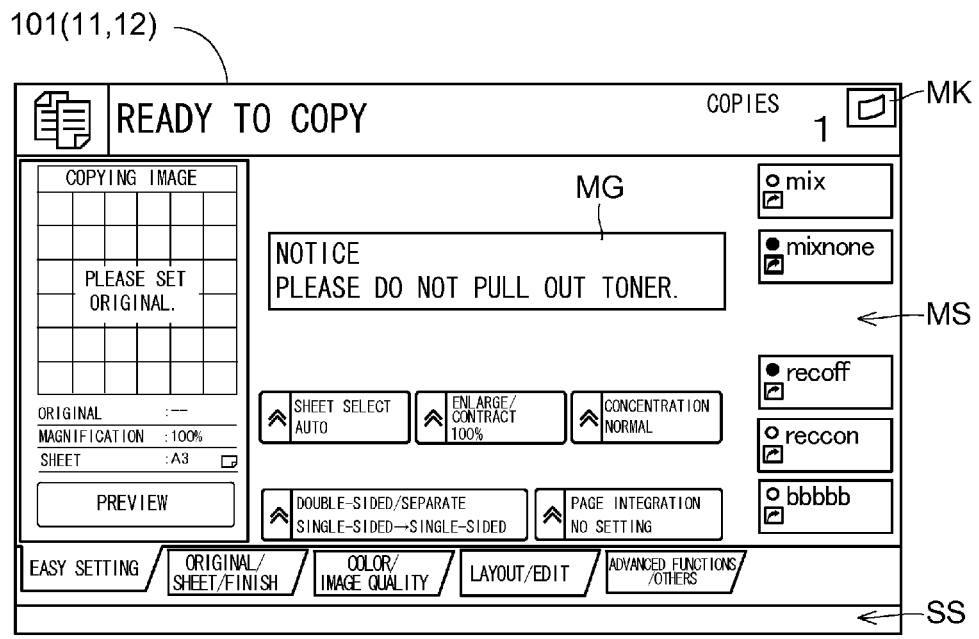
FIG. 4 is a view showing one example of a screen (a screen on which a message having an importance level "Low" is arranged in the form of a label) displayed on the display input device of the image forming apparatus according to the one embodiment of the present disclosure, which is shown in FIG. 1.

In this embodiment, as shown in FIG. 4, a message MG created by a user can be registered and displayed on the operation panel 101. For example, the message MG is composed of a title and text. In a message MG shown in FIG. 4, a character string "Notice" corresponds to the title, and a character string "Please Do Not Pull Out Toner" corresponds to the text.

Figure 5:
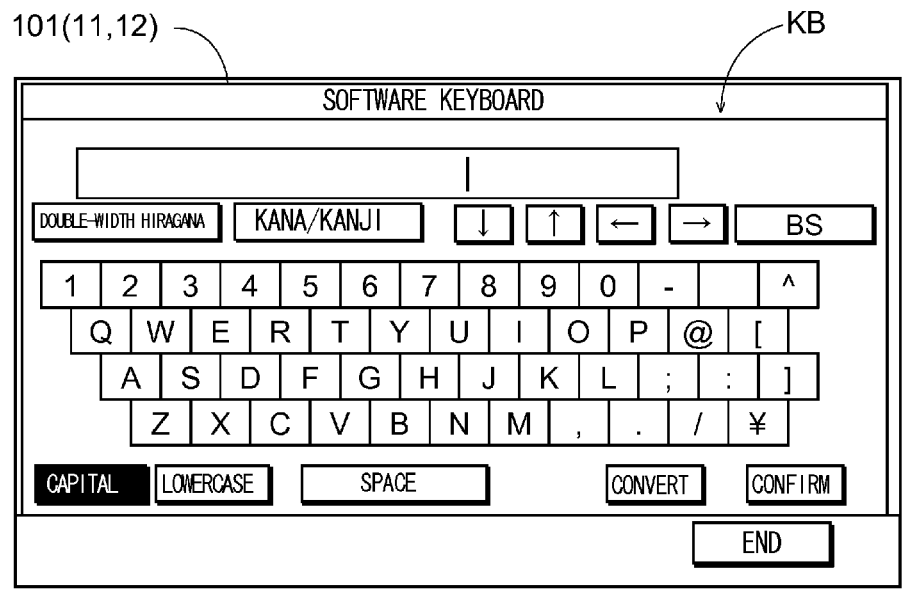
FIG. 5 is a view showing one example of a screen (a screen on which a software keyboard for creating a message is arranged) displayed on the display input device of the image forming apparatus according to the one embodiment of the present disclosure, which is shown in FIG. 1.

In order to accept a command to create a message MG, the display control portion 15 commands the liquid crystal display portion 12 to display a creation key MK on any of various screens. Then, upon the creation key MK being touched, the display control portion 15 performs control so that, as shown in FIG. 5, the liquid crystal display portion 12 displays a keyboard screen KB on which a software keyboard is arranged. This allows a user to create a desired message MG by using the software keyboard.

After completion of the creation of the message MG through the use of the keyboard screen KB, the display control portion 15 performs control so that the liquid crystal display portion 12 displays an importance level setting screen (not shown) for accepting a command to set an importance level to be assigned to the message MG. Through the use of the importance level setting screen, any one of a plurality of importance levels can be assigned to the message MG. For example, as importance levels that can be assigned to the message MG, the degree of importance is categorized into three levels that are an importance level "Low", an importance level "Medium", and an importance level "High". There is no particular limitation on the number of importance levels into which the degree of importance is categorized, and the degree of importance may be categorized into two levels or four or more levels.

Subsequently, the display control portion 15 performs control so that the liquid crystal display portion 12 displays a display period setting screen (not shown) for accepting a command to set a display period of the message MG (a point in time at which display of the message MG is to be started and a point in time at which the display of the message MG is to be ended). Through the use of the display period setting screen, for example, a period of time from startup of the apparatus until a lapse of an arbitrary length of time can be set as a display period. Further, a period of time from a start of a job until completion of the job (or alternatively, a period of time from a start of a job until a lapse of an arbitrary length of time) can be set as a display period. Further, a period of time from the occurrence of some error until the error is resolved (or alternatively, a period of time from the occurrence of some error until a lapse of an arbitrary length of time) can be set as a display period. Furthermore, it is also possible to designate a start point and an end point of a display period in terms of times of the day.

There is no particular limitation on the order in which setting of an importance level of the message MG and setting of a display period thereof are to be accepted. Furthermore, a configuration may be adopted in which setting of an importance level of a message MG and setting of a display period thereof are accepted through the use of a common screen.

After this, the display control portion 15 performs control so that the storage portion 16 stores display data for displaying the message MG a display period of which has been set and to which any one of the plurality of importance levels has been assigned. This is how a message MG created by a user is registered.

(Display of Message)

The display control portion 15 performs control so that the liquid crystal display portion 12 displays a message MG for a display period set at the time of the registration of the message MG. For example, the liquid crystal display portion 12 displays the message MG in the form of a label. Then, when displaying the message MG, the liquid crystal display portion 12 changes a display mode (including also a display position) of the message MG in accordance with an importance level set at the time of the registration of the message MG. There is no particular limitation on how the display mode of the message MG is changed.

Figure 6:
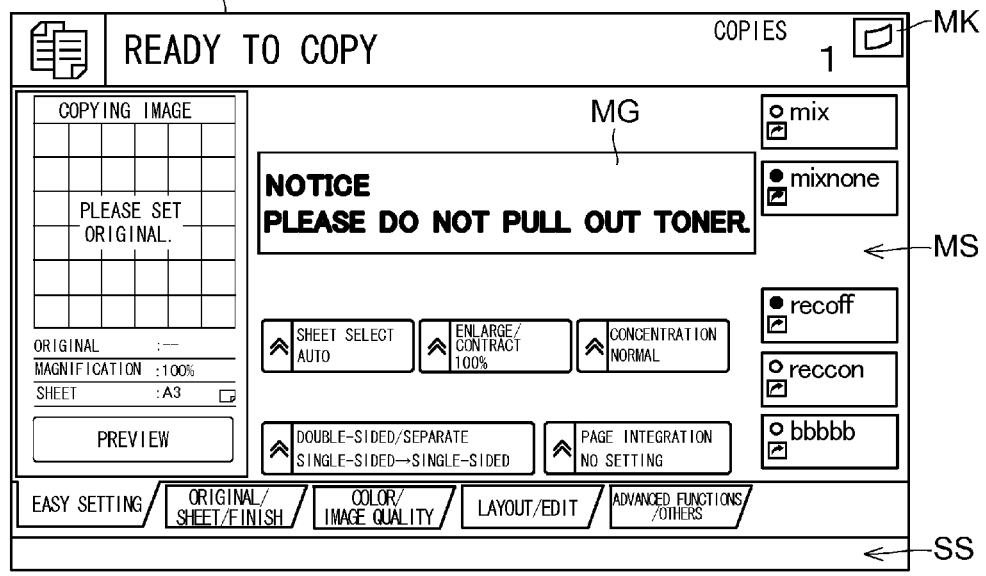
FIG. 6 is a view showing one example of a screen (a screen on which a message having an importance level "Medium" is arranged in the form of a label) displayed on the display input device of the image forming apparatus according to the one embodiment of the present disclosure, which is shown in FIG. 1.
Figure 7:
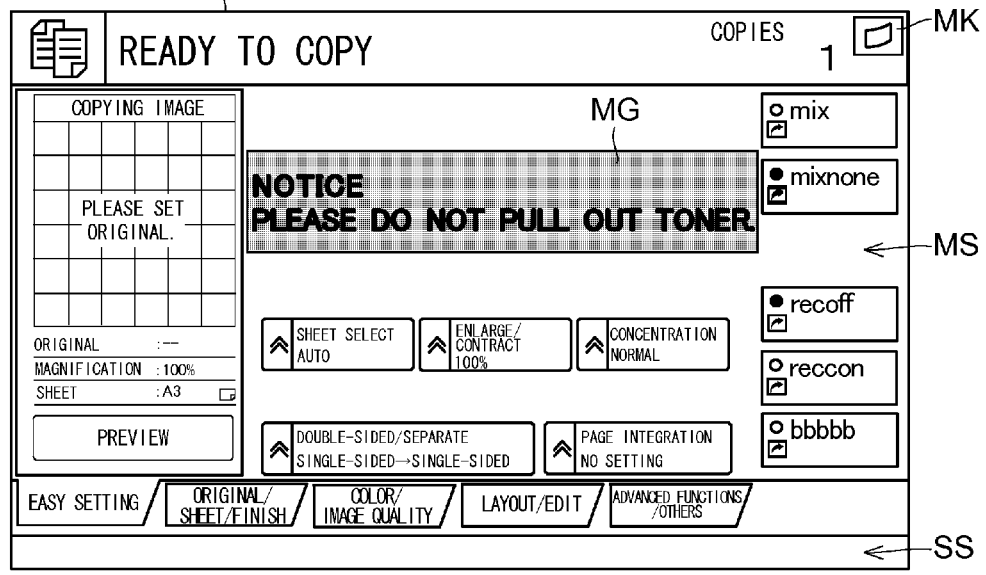
FIG. 7 is a view showing one example of a screen (a screen on which a message having an importance level "High" is arranged in the form of a label) displayed on the display input device of the image forming apparatus according to the one embodiment of the present disclosure, which is shown in FIG. 1.

For example, in a case where the importance level of the message MG is "Low", as shown in FIG. 4, the liquid crystal display portion 12 displays the message MG in black lightface characters. Furthermore, in a case where the importance level of the message MG is "Medium", as shown in FIG. 6, the liquid crystal display portion 12 displays the message MG in black boldface characters. Furthermore, in a case where the importance level of the message MG is "High", as shown in FIG. 7, the liquid crystal display portion 12 displays the message MG in cross-hatched characters. A configuration may be adopted in which the higher an importance level of a message MG is, the more a character size of the message MG is increased by increasing a display size of a label, or a character color of the message MG is made to vary in accordance with the importance level thereof. Or alternatively, a configuration may be adopted in which a message MG having a low importance level is displayed at a position on a sub-screen SS positioned below a main screen MS.

As described above, a display mode of a message MG is changed in accordance with an importance level thereof, and thus it becomes easy for a user to judge how important the message MS being displayed is, so that increased convenience is provided.

(Determination as to Whether or Not Plurality of Messages are Similar)

In this embodiment, the registration of a message MG is arbitrarily performed by a plurality of users. There, therefore, may be a case where a plurality of messages MG are registered, and respective display periods of the plurality of messages MG overlap with each other. In this case, the display control portion 15, when it has determined that the plurality of messages MG are not mutually similar, performs control so that the liquid crystal display portion 12 displays the plurality of messages MG. Furthermore, the display control portion 15, when it has determined that the plurality of messages MG are mutually similar, selects one of the plurality of messages as a message MG to be displayed, and performs control so that the liquid crystal display portion 12 displays only the selected message MG, while not displaying, among the plurality of messages MG, a message(s) MG other than the selected message MG.

For example, it is assumed that three messages MG reading "Please Do Not Pull Out Toner" (hereinafter, referred to as a first message MG), "It Is Dangerous to Take Out Black Powder" (hereinafter, referred to as a second message MG), and "Do Not Remove Black Ink!" (hereinafter, referred to as a third message MG), respectively, have been registered, and respective display periods of the first to third messages MG overlap with each other. The first to third messages MG, though formed of mutually different character strings, are messages MG for giving a warning that the toner container should not be pulled out. Accordingly, the display control portion 15 determines that the first to third messages MG are mutually similar.

In order to allow the display control portion 15 to perform such similarity determination, similarity determination information for determining whether or not a plurality of messages MG are mutually similar is stored in the storage portion 16. In the similarity determination information, a plurality of types of character strings are grouped by meaning, and among the grouped plurality of types of character strings, a plurality of types of character strings belonging to each common group are defined to be mutually similar.

For example, in the similarity determination information, a plurality of types of character strings (words) meaning a toner container are defined to be mutually similar and grouped in a common group. Furthermore, a plurality of types of character strings (words) meaning an action of pulling out some member are defined to be mutually similar and grouped in a common group. Furthermore, a plurality of types of character strings (words) meaning prohibiting some action are defined to be mutually similar and grouped in a common group.

Furthermore, in the similarity determination information, priorities have been set with respect to a plurality of types of character strings (words) belonging to each common group. For example, priorities have been set such that the higher a frequency of use of a character string, the higher a priority the character string assumes.

Based on such similarity determination information, the display control portion 15 determines whether or not a plurality of messages MG are mutually similar. Then, the display control portion 15, when it has determined that the plurality of messages MG are mutually similar, selects one of the plurality of messages MG as a display message MG to be displayed, and displays the display message MG in a display mode corresponding to the highest one of respective importance levels of the plurality of messages MG. The following describes this in detail by taking as an example the earlier described first to third messages MG. Herein, for the sake of convenience, it is assumed that a plurality of types of character strings meaning a toner container belong to a group A, a plurality of types of character strings meaning an action of pulling out some member belong to a group B, and a plurality of types of character strings meaning prohibiting some action belong to a group C.

The first message MG reading "Please Do Not Pull Out Toner" is formed of a character string belonging to the group A, a character string belonging to the group B, and a character string belonging to the group C. Based on this, the display control portion 15 determines that any message MG formed of a character string belong to the group A, a character string belonging to the group B, and a character string belonging to the group C is similar to the first message MG. Here, the second message MG reading "It Is Dangerous to Take Out Black Powder" is formed of three character strings belonging to the groups A to C, respectively. Furthermore, the third message MG reading "Do Not Remove Black Ink!" also is formed of three character strings belonging to the groups A to C, respectively. Accordingly, the display control portion 15 determines that the first to third messages MG are mutually similar.

Next, the display control portion 15 selects, among a plurality of mutually similar messages MG, a message MG containing a character string assuming the highest priority as a display message to be displayed. For example, in a case where priorities of the character strings forming the second message MG reading "It Is Dangerous to Take Out Black Powder" and the character strings forming the third message MG reading "Do Not Remove Black Ink!" are lower than priorities of the character strings forming the first message MG reading "Please Do Not Pull Out Toner", the display control portion 15 selects the first message MG as the display message.

Then, the display control portion 15 commands the liquid crystal display portion 12 to display a display message MG in a display mode corresponding to the highest one of respective importance levels of a plurality of mutually similar messages MG. For example, it is assumed that an importance level of the first message MG is set to be "Medium", an importance level of the second message MG is set to be "High", and an importance level of the third message MG is set to be "Low". In this case, the highest one of the respective importance levels of the plurality of mutually similar messages MG (the first to third messages MG) is "High". Accordingly, the liquid crystal display portion 12 uses, as a display mode for displaying the first message MG, a display mode corresponding to the importance level "High" of the second message MG, and not a display mode corresponding to the importance level "Medium" of the first message MG.

Furthermore, the display control portion 15 updates display data stored in the storage portion 16 so that the highest one of respective importance levels of a plurality of mutually similar messages MG is assigned to a display message MG (a message MG selected as a message to be displayed).

Figure 8:
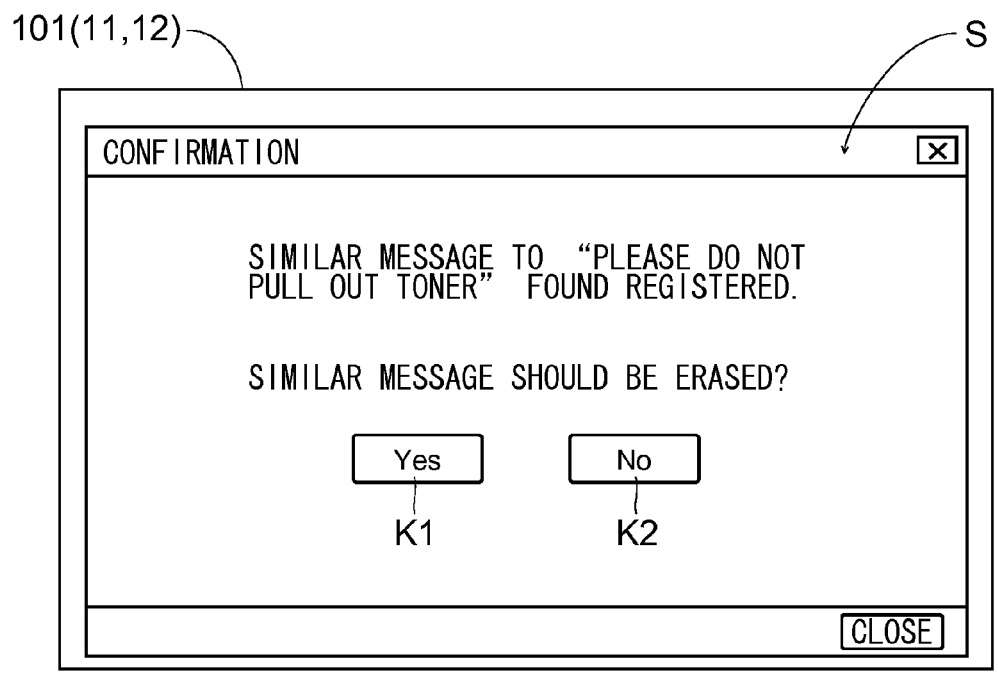
FIG. 8 is a view showing one example of a screen (a screen for accepting an input as to whether or not a message that has been registered should be erased) displayed on the display input device of the image forming apparatus according to the one embodiment of the present disclosure, which is shown in FIG. 1.

Moreover, the display control portion 15 performs control so that, among a plurality of mutually similar messages MG, a non-display message(s) MG other than a display message MG is erased from the storage portion 16. At this time, for example, the display control portion 15 performs control so that, as shown in FIG. 8, the liquid crystal display portion 12 displays an acceptance screen S for accepting an input as to whether or not, among the plurality of mutually similar messages MG, the non-display message(s) MG other than the display message MG should be erased. In this case, a touch on an "Yes" key K1 on the acceptance screen S causes erasure of the non-display message(s) MG. On the other hand, a touch on a "No" key K2 on the acceptance screen S causes no erasure of the non-display message(s) MG.

(Flow of Displaying Message)

Figure 9:
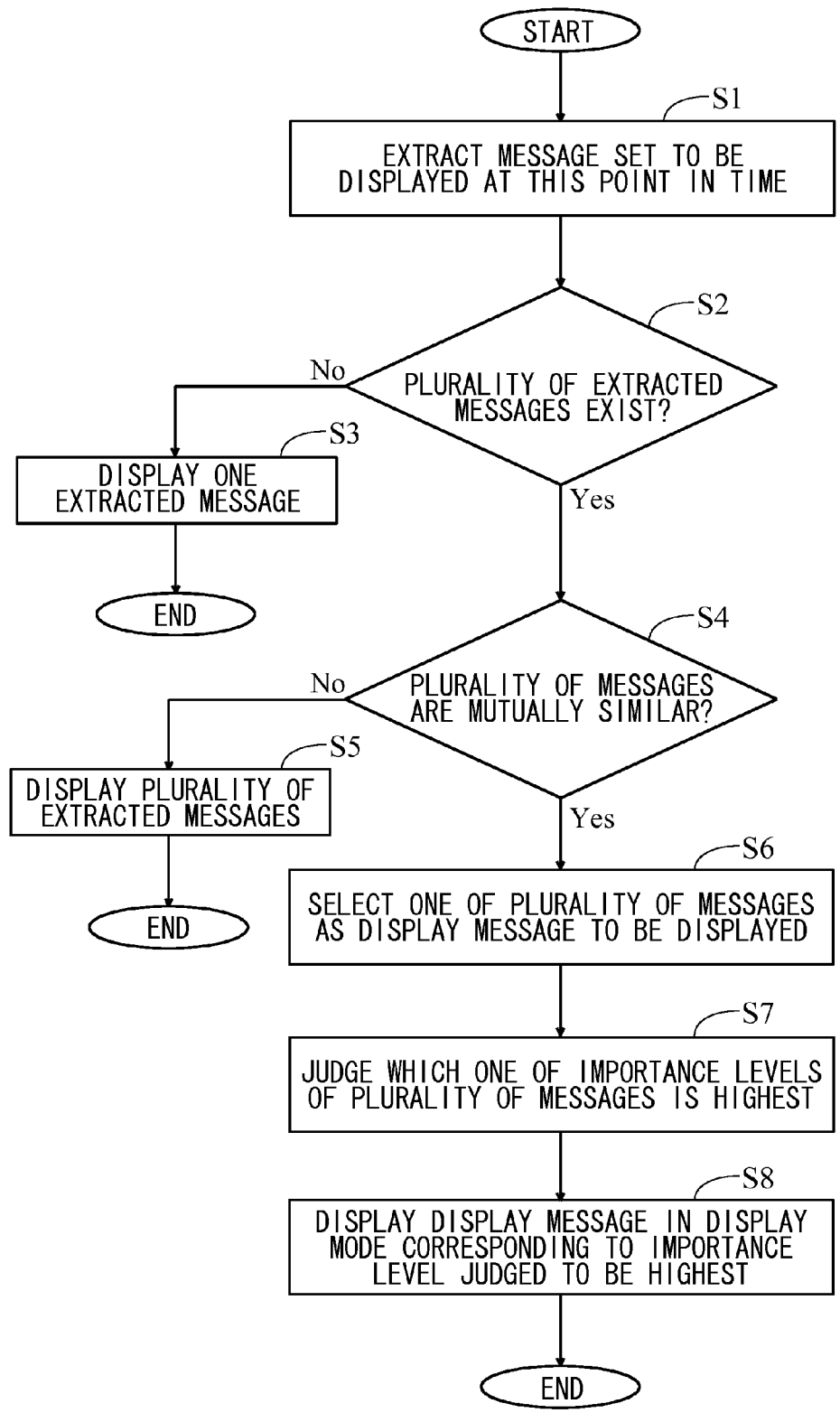
FIG. 9 is a flow chart for explaining an operation for displaying a message on the display input device of the image forming apparatus according to the one embodiment of the present disclosure, which is shown in FIG. 1.

Referring to a flow chart shown in FIG. 9, the following describes a flow of displaying a message MG.

First, when a point in time is reached at which display of, among registered messages MG, at least one message MG is to be started, the flow chart of FIG. 9 is started. At Step S1, the display control portion 15 extracts a message MG set to be displayed at this point in time. Then, at Step S2, the display control portion 15 determines whether or not there exist a plurality of extracted messages MG. In a case where a result of the determination finds that there is one extracted message MG, a transition is made to Step S3. Then, the display control portion 15 commands the liquid crystal display portion 12 to display the one extracted message MG in a display mode corresponding to an importance level of the one extracted message MG.

In a case where, at Step S2, it is determined that there exist a plurality of extracted messages MG (in a case where respective display periods of the plurality of messages MG overlap with each other), a transition is made to Step S4. Upon the transition to Step S4, the display control portion 15 determines whether or not the plurality of messages MG, the display periods of which overlap with each other, are mutually similar. In a case where a result of the determination finds that the plurality of messages MG are not mutually similar, a transition is made to Step S5. Then, the display control portion 15 commands the liquid crystal display portion 12 to display the plurality of messages MG.

In a case where, at Step S4, it is determined that the plurality of messages MG, the display periods of which overlap with each other, are mutually similar, a transition is made to Step S6. Upon the transition to Step S6, the display control portion 15 selects one of the plurality of mutually similar messages MG as a display message MG to be displayed. Subsequently, at Step S7, the display control portion 15 judges which one of respective importance levels of the plurality of mutually similar messages MG is the highest. Then, at Step S8, the display control portion 15 commands the liquid crystal display portion 12 to display the display message MG (the message MG selected at Step S6) in a display mode corresponding to the highest one (the importance level judged to be the highest at Step S7) of the respective importance levels of the plurality of mutually similar messages MG. At this time, the display control portion 15 performs control so that the liquid crystal display portion 12 does not display, among the plurality of mutually similar messages MG, a non-display message(s) MG other than the display message MG.

As discussed above, the operation panel 101 (display input device) of this embodiment includes the storage portion 16 that stores display data for displaying a message MG a display period of which has been set and to which any one of a plurality of importance levels has been assigned, the liquid crystal display portion 12 (display portion) that displays the message MG and changes a display mode of the message MG in accordance with an importance level thereof, and the display control portion 15 (determination portion) that determines whether or not a plurality of messages MG are similar. In a case where respective display periods of the plurality of messages MG overlap with each other, the display control portion 15 determines whether or not the plurality of messages MG are mutually similar. When the display control portion 15 has determined that the plurality of messages MG, the display periods of which overlap with each other, are mutually similar, the liquid crystal display portion 12 selects one of the plurality of mutually similar messages MG as a display message MG to be displayed, and displays the display message MG in a display mode corresponding to the highest one of respective importance levels of the plurality of mutually similar messages MG, while not displaying, among the plurality of mutually similar messages MG, a message(s) MG other than the display message.

According to the configuration of this embodiment, in a case where respective display periods of a plurality of mutually similar messages MG overlap with each other, among the plurality of messages MG, one message MG is selectively displayed as a display message MG to be displayed, and a message(s) MG other than the display message MG is not displayed. That is, in no case are a plurality of mutually similar messages MG concurrently displayed in mutually different display modes (importance levels), and thus it is possible to prevent an inconvenience from arising in which a user becomes confused, being unable to judge which one of the importance levels of the plurality of messages MG should be relied upon, so that improved user convenience is provided. Moreover, as a display mode of the display message MG, a display mode corresponding to the highest one of the respective importance levels of the plurality of mutually similar messages MG is used. This prevents the importance level of the display message MG from being underestimated.

Furthermore, in this embodiment, as discussed above, the storage portion 16 pre-stores a plurality of types of character strings, with respect to which priorities have been set, respectively, and the liquid crystal display portion 12 selectively displays, among the plurality of mutually similar messages MG, a message MG containing a character string assuming the highest priority as the display message MG. This makes it easy to determine which one of the plurality of mutually similar messages MG should be selected as the display message MG.

Furthermore, in this embodiment, as discussed above, the storage portion 16 updates the display data so that the highest one of the respective importance levels of the plurality of mutually similar messages MG is assigned to the display message MG. Moreover, the storage portion 16 erases, among the plurality of mutually similar messages MG, a non-display message(s) MG other than the display message MG. This can reduce the number of messages MG to be subjected to similarity determination and thus increases a processing speed for performing similarity determination.

Furthermore, in this embodiment, as discussed above, the liquid crystal display portion 12 displays an acceptance screen S for accepting an input as to whether or not the non-display message(s) MG should be erased, and the storage portion 16, when it has accepted an input commanding erasure of the non-display message(s), erases the non-display message(s) MG. Here, a user may want a message MG registered by himself/herself to be retained instead of being erased. From this point of view, it is preferable to adopt a configuration in which the non-display message(s) MG is erased when an input commanding erasure of the non-display message(s) MG has been accepted.

The embodiment disclosed herein is to be construed in all respects to be illustrative and not limiting. The scope of the present disclosure is indicated by the appended claims rather than by the foregoing description of the embodiment, and all changes that come within the meaning and range of equivalency of the claims are intended to be embraced therein.

What is claimed is:

1. A display input device, comprising:
 a storage portion that stores display data for displaying a message a display period of which has been set and to which any one of a plurality of importance levels has been assigned;
 a display portion that displays the message and changes a display mode of the message in accordance with an importance level thereof; and
 a determination portion that determines whether or not a plurality of the messages are similar,
 wherein:
 the storage portion stores similarity determination information for determining whether or not the plurality of messages are mutually similar,
 in the similarity determination information, a plurality of types of character strings are grouped by meaning, and among the grouped plurality of types of character strings, a plurality of types of character strings that belong to each common group are defined to be mutually similar, in a case where respective display periods of the plurality of messages overlap with each other, the determination portion determines, based on the similarity determination information, whether or not the plurality of messages, the display periods of which overlap with each other, are mutually similar, when the determination portion has determined that the plurality of messages, the display periods of which overlap with each other, are mutually similar, the display portion selects one of the plurality of mutually similar messages as a display message to be displayed, and displays the display message in a display mode corresponding to a highest one of respective importance levels of the plurality of mutually similar messages, while not displaying, among the plurality of mutually similar messages, a message other than the display message, and when determining whether or not a first message, which is one of the plurality of messages, is similar to a second message, which is another of the plurality of messages and is different from the first message, the determination portion identifies a plurality of groups to which a plurality of types of character strings that form the first message respectively belong and, if the second message is formed of a plurality of types of character strings that respectively belong to the plurality of groups identified for the first message, the determination portion identifies that the first and the second messages are mutually similar.

2. The display input device according to claim 1, wherein the storage portion pre-stores a plurality of types of character strings, with respect to which priorities have been set, respectively, and the display portion selectively displays, among the plurality of mutually similar messages, a message containing a character string assuming a highest priority as the display message.

3. The display input device according to claim 2, wherein the respective priorities of the plurality of types of character strings have been set such that the higher a frequency of use of a character string, the higher a priority the character string assumes.

4. The display input device according to claim 1, wherein the storage portion updates the display data so that a highest one of respective importance levels of the plurality of mutually similar messages is assigned to the display message.

5. The display input device according to claim 4, wherein the storage portion erases, among the plurality of mutually similar messages, a non-display message other than the display message.

6. The display input device according to claim 5, wherein the display portion displays an acceptance screen for accepting an input as to whether or not the non-display message should be erased, and the storage portion, when it has accepted an input commanding erasure of the non-display message, erases the non-display message.

7. An image forming apparatus comprising the display input device according to claim 1.

8. A method for controlling a display input device that displays a message a display period of which has been set and to which any one of a plurality of importance levels has been assigned, and changes a display mode of the message in accordance with an importance level thereof, the method comprising steps of:

determining, in a case where respective display periods of a plurality of the messages overlap with each other, whether or not the plurality of messages, the display periods of which overlap with each other, are mutually similar based on similarity determination information;

selecting, when it has been determined that the plurality of messages, the display periods of which overlap with each other, are mutually similar, one of the plurality of mutually similar messages as a display message to be displayed; and displaying the display message in a display mode corresponding to a highest one of respective importance levels of the plurality of mutually similar messages, while not displaying, among the plurality of mutually similar messages, a message other than the display message, wherein:

the similarity determination information includes a plurality of types of character strings grouped and among the grouped plurality of types of character strings, a plurality of types of character strings that belong to each common group are defined to be mutually similar, and when determining whether or not a first message, which is one of the plurality of messages, is similar to a second message, which is another of the plurality of messages and is different from the first message, a plurality of groups to which a plurality of types of character strings that form the first message respectively belong are identified and, if the second message is formed of a plurality of types of character strings that respectively belong to the plurality of groups identified for the first message, it is identified that the first and the second messages are mutually similar.

* * * * *